No. 859,734. PATENTED JULY 9, 1907.
W. J. D. BRANSCOM.
FLY TRAP.
APPLICATION FILED NOV. 13, 1906.
2 SHEETS—SHEET 1.
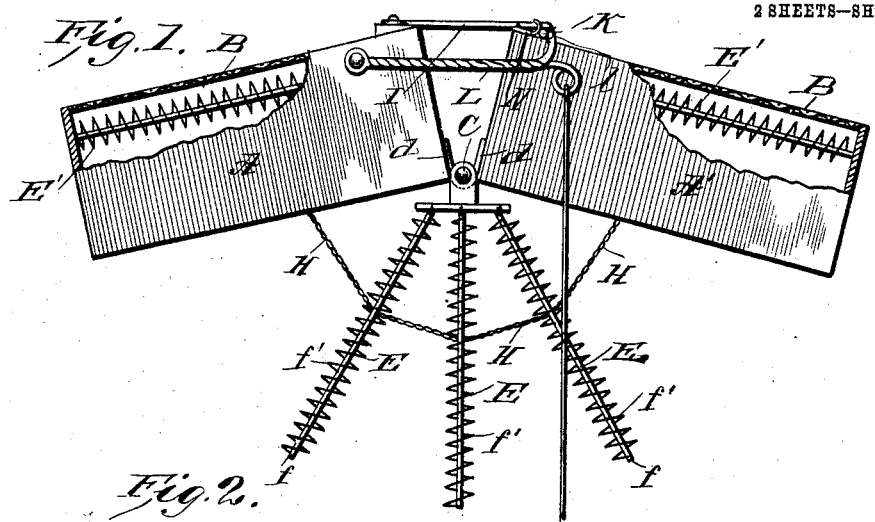
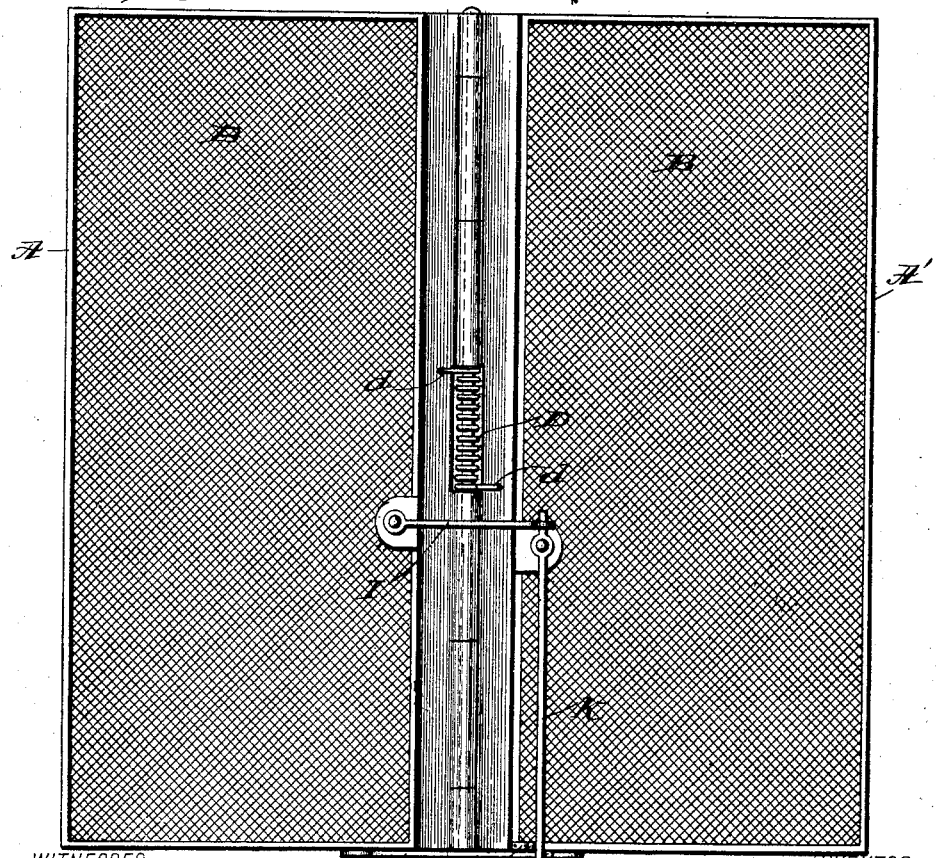
WITNESSES
INVENTOR
WILLIAM J. D. BRANSCOM
BY
ATTORNEYS No. 859,734. PATENTED JULY 9, 1907.
W. J. D. BRANSCOM.
FLY TRAP.
APPLICATION FILED NOV. 13, 1906.
2 SHEETS—SHEET 2.
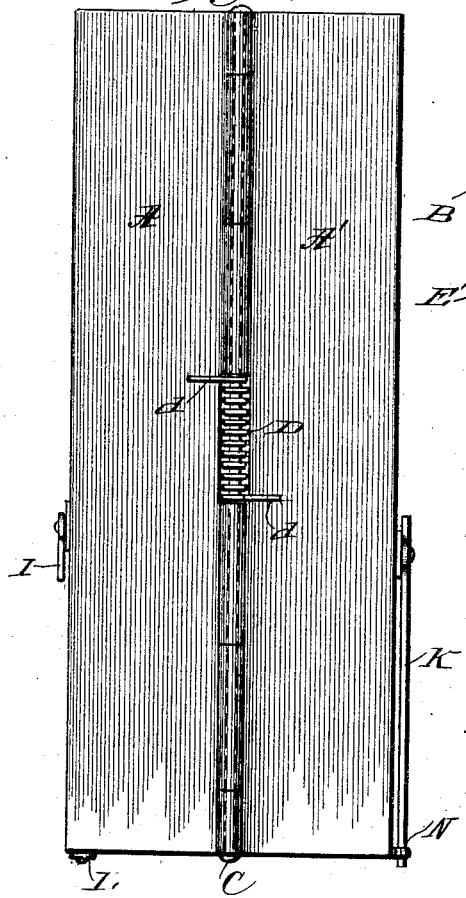
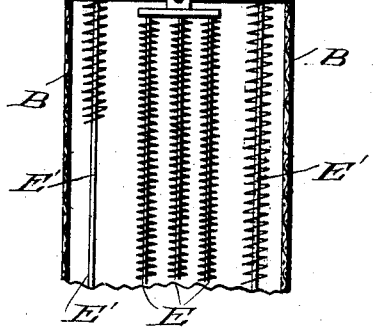
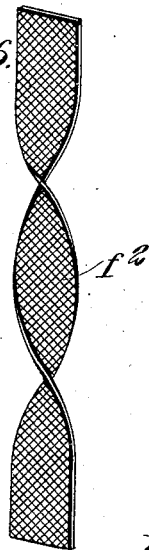
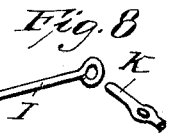
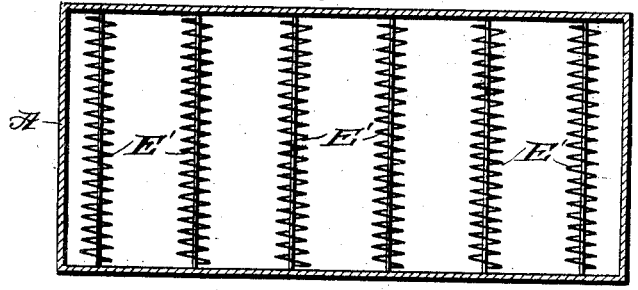
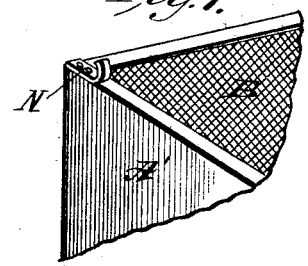
WITNESSES
E. M. Callaghan
C. A. Petta
INVENTOR
WILLIAM J. D. BRANSCOM
BY Munn & Co.
ATTORNEYS

UNITED STATES PATENT OFFICE.

WILLIAM J. D. BRANSCOM, OF MOBILE, ALABAMA.

FLY-TRAP.

No. 859,734.     Specification of Letters Patent.     Patented July 9, 1907.

Application filed November 13, 1906. Serial No. 343,228.

*To all whom it may concern:*

Be it known that I, WILLIAM J. D. BRANSCOM, a citizen of the United States, and a resident of Mobile, in the county of Mobile and State of Alabama, have invented an Improved Fly-Trap, of which the following is a specification.

In my invention devices are provided upon which flies alight, and such devices which thus constitute perches or roosts, are connected with spring actuated frames of box-like form, which are hinged together and adapted to inclose said perches or roosts, and when released by manual operation of trip mechanism, the parts assume their former normal working relation. The outer sides of the box-like frames are formed of woven wire which enables the flies to be easily destroyed by flame or water when entrapped by closure of said frames.

The details of construction, arrangement and operation of parts are as hereinafter described and illustrated in the accompanying drawing, in which Figure 1 is an end elevation of my improved trap when set in working position, portions being broken away to show details of construction. Fig. 2 is a plan view of the trap with the parts in the position shown in Fig. 1. Fig. 3 is a plan view of the trap in the folded or closed position. Fig. 4 is a longitudinal section of one of the box-like portions of the trap. Fig. 5 is a longitudinal section of a portion of the trap in the closed position. Fig. 6 is a perspective view of a twisted strip of woven wire which may be employed as a fly perch or roost. Fig. 7 is a perspective view of a portion of one of the box-like parts composing the body of the trap. Fig. 8 is a perspective view illustrating the means by which the two opposite parts of the trap are held open.

The body of the trap is composed of two like parts A, A', the same consisting of two rectangular oblong boxes or frames preferably formed of sheet metal and having backs composed of woven wire B. These box-like parts are hinged together at one edge, a pintle or hinge-rod C passing through eyes formed on the backs of the same, as will be understood by reference to Fig. 3. A spiral spring D is coiled about the central portion of the rod, the backs of the frames A, A', being cut away to provide space for the same, and the ends $d$ of such spring are extended on the backs of the boxes so that it tends to hold the boxes closed as in Figs. 3 and 5 when released by trip mechanism, which will be presently described.

From the pintles C, I suspend a series of frames E— see Fig. 1—comprising perches or roosts. The latter are preferably formed by means of rods $f$ having a wire $f'$ coiled about them. Loose material upon which the flies would tend to alight may be interwoven with the wire $f'$ or supported thereby. I may construct the perches or roosts $f$ in other ways. For instance, I may form them of strips of woven wire $f^2$, as indicated in Fig. 6. There are three sets of perches E, the same being pivoted to supporting plates having perforated lugs or ears through which the hinge-rod C passes. Thus all the perches E are pivoted to the boxes A, A', and suspended therefrom as shown. The perches will have a staggered arrangement to adapt them to fold closer together than would be otherwise practicable. In order to hold the several perches E separated from each other when the trap is set as indicated in Fig. 1, I provide chains H or other suitable means for connecting them with each other and with the boxes A, A'. It will be understood that the ends of the chains are attached to the boxes and that intermediately they are attached to the several frames. Thus, they hold the frames distended when the trap is set, but allow them to fold and hang pendent when the trap is closed.

Within the frames or boxes A, A', and parallel to the woven wire backs B but supported therefrom I arrange a series of perches E' which extend transversely to said frame as shown in Figs. 1, 4 and 5. They may be constructed similar to the perches E before described.

For holding the trap set, I employ the following means. A wire or rod I is pivoted to one of the frames A, and its opposite or free end is provided with an eye, which receives the shorter arm of a rod K that is pivoted to the opposite frame A' and extends beyond one end of the same where it is engaged with the hooked end $l$ of a rod L that is pivoted to the end of frame A. The locking rod L is also provided at its free end with an eye to which a pull cord, string or wire M is attached. It will now be apparent that if the parts be engaged as shown in Figs. 1 and 2, the frames A, A', will be held separated at an obtuse angle to each other, and the trap being then suspended from the ceiling, the perches will be exposed so that flies may alight thereon. When a large number of flies has collected on the perches, the string or wire M is pulled to release the hook $l$ from the trip lever K, which is then released from the rod I, so that the spring D is left free to instantly close the frames A, A', together, as in Fig. 3, whereby the perches E, E', with the flies thereon are inclosed, and the flies imprisoned. Then by applying a flame to either of the wire gauze sides B, or by pouring water therethrough, or by immersing the trap in water, the flies may be quickly and easily destroyed.

For the purpose of holding the trap open as in Figs. 1 and 2, for discharging dead flies, and without the aid of the locking bar L, I provide a hook N—see Figs. 2 and 7—which is secured to one of the parts A' and with which the longer arm of the trip rod K may be engaged. Thus the parts A, A', may be held open without danger of closing suddenly, as would be the case if the locking and trip mechanism were employed.

I claim:

1. A fly trap comprising box-like parts having sides formed of woven wire, such parts being hinged together, fly perches or roosts suspended from the hinge, means for separating the perches when the trap is set, a spring for holding the boxes normally closed, and locking and trip mechanism adapted for holding them in the open position and for suddenly releasing the same when tripped, substantially as described.

2. The improved fly trap comprising box-like inclosures which are entirely open on one side and hinged together, perches connected with the hinge, and locking the trip mechanism whereby the said inclosures may be held open or set and may be released in the manner described.

3. The improved fly trap comprising box-like inclosures having a wire gauze back and hinged together, perches suspended from the hinge portion of said inclosures and adapted to be covered by said inclosures, means for locking the latter in the open position and means for tripping the locking means for sudden release of the inclosures, substantially as described.

4. The improved trap comprising box-like inclosures which are open on one side and hinged together, a fly perch suspended from the inclosures and comprising parts which are hinged and adapted to swing laterally, and devices connected with the box-like inclosures and with the perches whereby when the trap is set the perches are separated more widely, substantially as described.

5. In a fly trap of the class indicated, the combination with box-like parts hinged together, of fly perches E suspended from such inclosures, and comprising frames having perches proper which are "staggered," or arranged in the alternation specified, whereby they are adapted to fold together compactly, as described.

6. In a fly trap of the class indicated, a fly perch comprising a box and perches proper consisting of wires wound spirally and devices for holding the wires in the required position, substantially as described.

7. A fly trap comprising box-like inclosures having sides formed of woven wire hinged together, a spring for effecting their closure, means for locking the trap in the set position said means including a trip device adapted for releasing the lock, and a perch proper adapted to be inclosed when the trap is sprung, substantially as described.

8. The combination with the trap proper comprising box-like frames hinged together, of a spring for closing them forcibly, a perch proper suspended from and adapted to be inclosed when the trap is sprung, means for setting the trap comprising a rod pivoted to one of the frames and extending across the other, its free end being provided with an eye, a trip rod pivoted to the opposite frame and its shorter arm engaging the eye of the aforesaid rod, and a pivoted locking rod which engages the longer arm of the trip rod, substantially as described.

WILLIAM J. D. BRANSCOM.

Witnesses:
  D. P. BESTOR, Jr.,
  D. P. BESTOR.